US005438677A

United States Patent [19]

Adams et al.

[11] Patent Number: 5,438,677

[45] Date of Patent: Aug. 1, 1995

[54] MUTUAL EXCLUSION FOR COMPUTER SYSTEM

[75] Inventors: Robert T. Adams, Lake Oswego; Vincent R. Slyngstad, Portland; Seckin Unlu, Aloha, all of Oreg.

[73] Assignee: Intel Corporation, Santa Clara, Calif.

[21] Appl. No.: 931,928

[22] Filed: Aug. 17, 1992

[51] Int. Cl.[6] .................... G06F 9/46

[52] U.S. Cl. .................... 395/736; 364/241.2; 364/241.6; 364/242.2; 364/280.8; 364/DIG. 1; 364/941.4; 364/941.8; 364/DIG. 2; 395/735; 395/739

[58] Field of Search .................... 395/725, 275, 325, 700; 364/241.2, 241.4, 241.5, 242.2, 280.8, DIG. 1, 941, 941.3, 941.4, 941.6, 941.8, DIG. 2

[56] References Cited

U.S. PATENT DOCUMENTS

| | | | |
|---|---|---|---|
| 4,271,468 | 6/1981 | Christensen et al. | 395/275 |
| 4,604,500 | 8/1986 | Brown et al. | 379/269 |
| 4,631,670 | 12/1986 | Bradley et al. | 395/725 |
| 4,768,149 | 8/1988 | Konopik et al. | 395/275 |
| 4,779,195 | 10/1988 | James | 395/725 |
| 4,833,598 | 5/1989 | Imamura et al. | 395/650 |
| 4,860,190 | 8/1989 | Kaneda et al. | 395/275 |
| 5,101,497 | 3/1992 | Culley et al. | 395/725 |
| 5,161,228 | 11/1992 | Yasui et al. | 395/725 |
| 5,163,152 | 11/1992 | Okamoto | 395/725 |
| 5,255,379 | 10/1993 | Melo | 395/400 |

OTHER PUBLICATIONS

UNIX System Laboratories, *UNIX® System V Release 4, Device Driver Interface/Driver-Kernel Interface Reference Manual* (1992), pertinent pages.

Intel Corporation, *Peripheral Components* (1991), pp. 3-171 to 3-194.

*Primary Examiner*—Jack B. Harvey
*Assistant Examiner*—Glenn A. Auve
*Attorney, Agent, or Firm*—Blakely, Sokoloff, Taylor & Zafman

[57] ABSTRACT

Method and apparatus of mutual exclusion for executing protected code in a computer system. If an interrupt occurs during the execution of protected code, then the computer system is reconfigured to exclude interrupts having a lower priority than the current exclusion level and the interrupt is either deferred (if it has a lower priority than the current dessired exclusion level) or serviced (if it has a priority higher than the current desked exclusion level). In some embodiments, for computer systems which use a programmable interrupt controller (PIC), the PIC is reprogrammed. In other systems using a software-controlled interrupt handling, the kernel of the operating system is informed of the change in exclusion level. In summary, the system is only configured to a new exclusion level if an interrupt actually occurs, and thus, the latency resulting from reconfiguration is not incurred if an interrupt is not generated during the execution of the protected code.

20 Claims, 5 Drawing Sheets

200

300a

300b
A
305
INTERRUPT PRIORITY LEVEL HIGHER THAN EXCLUSION LEVEL?
NO
YES
310
PROGRAM PIC TO EXCLUDE LOWER LEVEL INTERRUPTS THAN INTERRUPT
306
STORE INTERRUPT ROUTINE ADDRESS
311
PROCESS INTERRUPT
307
PROGRAM PIC TO EXCLUDE LOWER LEVEL INTERRUPTS THAN CURRENT DESIRED EXCLUSION LEVEL
312
PROGRAM PIC TO DESIRED INTERRUPT EXCLUSION LEVEL
308
CONTINUE PROCESSING PROTECTED CODE
B

MUTUAL EXCLUSION FOR COMPUTER SYSTEM

BACKGROUND OF THE INVENTION

1. Field of the Invention

The present invention relates to mutual exclusion in a computer system. More specifically, the present invention relates to a process for mutual exclusion for interrupt handling which is adaptive and reconfigurable in a computer system to an application program's requirements. 2. Backaround of Related Information Computer systems require a means for servicing input/output devices such as keyboards, displays, sensors, and other components in order to allow the input/output device to communicate with the processor. One method of a processor communicating with input/output devices is shown in FIG. 1*a*. This is known as the "polled" method. A central processing unit 101 is coupled to a CPU-driven multiplexer 104 wherein each input/output device is selected and queried to determine if the device needs servicing. For instance, device 104, under control of CPU 101. will select over lines 105*a*, 106*a*, and 107*a* each of the input/output devices 105 through 107 and query those devices to determine whether each device needs servicing. This approach suffers from the disadvantage that a continuously executing process (multiplexer 104) is required by CPU 101, in order to ensure that each of the input/output devices is serviced regularly. This has a detrimental affect on system throughput because a large percentage of the processor overhead is consumed by such polling.

A more common and desirable method of computer system architecture used in most modem systems is the use of an interrupt. A block diagram of an interrupt-based system is shown as system 150 in FIG. 1*b*. Execution of instructions by a CPU such as 151 is continuous, and is only interrupted by a programmable interrupt controller (PIC) 154 when the controller determines that an input/output device needs servicing. PIC 154 is an overall manager which accepts requests from the I/O peripheral equipment, and determines which of the incoming requests has the highest importance (priority). PIC 154 ascertains whether the incoming request has a higher priority value than a current interrupt level, and may issue an interrupt to CPU 151 based upon this determination. For example, if an interrupt was being serviced for an input/output device 155, and an interrupt was issued by higher priority input/output device 156 over line 156a, then PIC 154 will issue an interrupt to CPU 151 over line 154*a* for servicing of input/output device 156. Then, communication with CPU 151 over bus 160 by input/output device 156 may be performed. Once an interrupt is detected by the CPU 151 over line 154*a*, an interrupt servicing routine sometimes known as an "interrupt handler" is called to service the device. In some prior art systems, each individual input/output device has its own interrupt handler which forms part of its device driver.

Various input/output devices have different priorities in interrupt-driven systems such as 150 shown in FIG. 1*b*. For example, in the original version of the UNIX® brand. operating system (UNIX® is a registered trademark of UNIX System Laboratories, Inc.), seven interrupts were provided in the system which were numbered 1 through 7. In the prior art UNIX® brand operating system, the higher the priority number, the higher the priority of the interrupt. A level 6 interrupt will therefore preempt a level 5 interrupt. For example, in the prior art UNIX® brand operating system, fixed input/output devices such as hard disk drives are assigned an interrupt level 5 and serial ternfinal lines are assigned an interrupt level 6 (note that these numbers vary for various versions of the UNIX® brand operating system).

Modem personal computers, such as those using the AT-type architecture, are designed. as single-user, single-tasking systems which are, in general, not interrupt-driven systems. Therefore, when porting the multi user. multitasking, interrupt-driven UNIX® brand operating system to a computer architecture system such as the AT platform, some architectural mismatches occur. For example, the UNIX® brand operating system uses seven prioritized interrupt levels, however. the AT-type architecture has a master and one or more slaved 8259A-type programmable interrupt controllers (PIC's) that, although also prioritized. do not correspond with those used in UNIX® (the 8259A PIC is available from Intel Corporation of Santa Clara, Calif.). In FIG. 1*b*, the 8259A PIC's are shown as 154. In the prior art UNIX® brand operating system which is desired to be ported to an AT-type system, serial devices utilize interrupts 2 and 5, which correspond to the UNIX® brand operating system's level 6. A hard disk or other fixed media disk drive has an interrupt 14 on the AT system which corresponds to the UNIX® level 5. One 8259A brand PIC can mask each of its interrupt lines in order to simulate a UNIX® interrupt priority level by preventing the acknowledgement of interrupts from lower priority devices. A detailed description of the programming of the 8259A PIC may be found in the publication *Intel Peripheral Components* (1991), available from Intel Corporation Literature Sales, P.O. Box 7641, Mount Prospect, Ill. 60056-7641 (hereinafter "Peripheral Components"). In order to port an operating system such as UNIX® to an AT-type architecture, during run-time, interrupts for certain devices having a lower priority in UNIX® may be prevented from being acknowledged by reprogramming PIC's 154 when servicing higher level devices. This reprogramming suffers from some drawbacks, however.

Prior art interrupt controllers employing these techniques, such as the 8259A PIC, suffer from performance problems due to the latency involved in programming the controller. In addition, in order to ensure that the PIC works properly, a reprogramming operation must also wait a period of time for circuitry within the controller to settle in order to process interrupts reliably. In certain PIC's such as the 8259A, after programn-fing is complete, approximately one microsecond must transpire prior to executing any additional code. Interrupt handling will therefore take approximately one microsecond longer. Note that in a system containing multiple PIC's (the original AT-type platform contains two) the reprogramming operation will have to wait one microsecond after the last PIC is programmed. to allow all the PIC's to settle. In modern systems with processors operating at faster speeds, this poses a serious processing bottleneck.

UNIX® brand operating system device drivers operate as a collection of cooperating "threads." Most of these correspond to the notion of "processes" as generally used in discussions of this operating system. These processes operate at the lowest priority, priority zero. A device driver in this system has a higher priority thread for each hardware interrupt used by the device(s) being controlled. In general, this interrupt thread has the responsibility for manipulating the device (since it is synchronized with the device by the interrupt itself). The main task of the process threads is to communicate with the interrupt thread. Such communication is accomplished by means of shared data structures in the computer system memory. When multiple threads desire to modify shared data structures, a mutual exclusion problem is raised. This problem is solved in the device driver case by the use of functions entitled splN() and splx() in the UNIX® brand operating system. Spl() functions or "system priority level" functions are used for setting or resetting interrupt priority levels in the UNIX® brand operating system which will be recognized. A detailed discussion of the spl() functions are found in the publication entitled "UNIX® System V, Release 4: Device Driver Interface/Driver-Kemel Interface Reference Manual for Intel Processors" available from UNIX System Laboratories, Inc. Corporate Sales of Engwood CliffS, N.J. (hereinaftcr "Driver-Kernel Manual"). Essentially, splN() acquires a read/write lock on all data structures of priority N or lower. The splint() function restores the data structure to the previous exclusion level. The PIC and similar external hardware in the system is used to prevent devices from causing interrupts which should not be taken because their interruler routines would deadlock on this read/write lock.

While the description which follows relates the discussion of the interrupt subsystem, it is clear that the techniques described here have equal applicability to some instances of the larger problem of mutual exclusion where it is difficult or expensive to inform some processes or devices that a lock is present.

One prior art method of blocking interrupts for AT-type systems running the UNIX® brand operating system is shown and discussed with reference to FIG. 2. This prior art method of interrupt processing is performed by reprogramming the PIC in the system every time code is executed in order to mask or prevent lower priority interrupts from occurring. This prior art process shown in FIG. 2 suffers from the disadvantage that it unnecessarily programs the PIC even when no lower priority interrupt later occurs. Therefore, processing bandwidth is consumed by programming the PIC when it is sometimes not necessary. For example, process 200 starts at step 201 and sets the desired interrupt priority level at step 202. First, the operating system calls an appropriate "spl()" (such as splN()) function in the UNIX® brand operating system in order to block or allow servicing of interrupts by the operating system. The spl() function will reprogram the PIC to mask all interrupts having a priority level less than the priority level set at step 202. This is accomplished in some prior art personal computers and workstations using the UNIX® brand operating system by programming PIC's such as 154 shown in FIG. 1*b*, by calling an outb() function which writes a byte to an 8-bit input/output port on the processor to the PIC. This function is discussed in Driver-Kernel Manual. Note that the reprogramming process discussed with reference to steps 203,207,209, and 211 in FIG. 2, all include an outb() function call tollowed by an inb() function which attempts to gad from the I/O port on the processor that the PIC is coupled to. This allows the PIC to settle prior to executing any additional code. The inb() instruction will not be able to read from the I/O port until the circuitry has settled, which in the prior art, typically takes an additional microsecond. Each reprogramming operation will therefore consume at least one additional microsecond in addition to the time it takes to program the PIC.

After reprogramming the PIC Lit step 203, the protected code is then executed at step 204. After the start of code execution. an interrupt may be asserted by a lower priority device at step 205 but, because the PIC has been reprogrammed to ignore these interrupts, they are not recognized, and therefore, not serviced. The CPU in the system never receives the interrupt. Then, at step 206, the splx() function is called in order to reset the priority level of the interrupts in the operating system kernel to the state it was in prior to step 202. Then, the PIC is reprogrammed again at step 207 to allow the interrupts previously masked out to be recognized. Again, as discussed with reference to step 203 above, this process is performed using the outb() instruction to write to the 8-bit I/O port, and is followed by an inb() instruction to allow the PIC to settle. Then, at step 208, the interrupt previously masked is recognized by the PIC, and, at step 209, the PIC is again reprogrammed for a new interrupt priority level as in step 202 above. This is to prevent any other lower priority interrupts from occurring. At step 210, the interrupt handler for any pending interrupts which were masked by the PIC at step 203 is called to service the interrupting device. At step 211, the PIC is then again reprogrammed to tile state it was in prior to step 202. Then, at step 212, process 200 returns from the interrupt, and process 200 ends at step 213. As shown in process 200, the PIC has been reprogrammed a total of four times in this prior art method, thus incurring substantial latency due to the time required for reprogramming the PIC, and the time required for waiting for tile PIC circuitry to settle. In addition, if no interrupt occurs (such as occurred at step 208), the PIC has been unnecessarily programmed two times at steps 203 and 207. In othcr words, because no interrupt at all occurred, the PIC needn't have been reprogrammed. These reprogramming and waiting operations consume substantial processor overhead and reduce overall performance of the system unnecessarily.

Thus, substantial performance penalties are incurred in prior art interrupt handling techniques especially while attempting to map interrupt priorities for one operating system designed for one computer architecture to another.

SUMMARY AND OBJECTS OF THE INVENTION

One of the objects of the present invention is to provide an interrupt handling process which provides for the portability of interrupt handling across many computer architectures.

Another of the objects of the present invention is to provide a method for masking interrupts which does not incur the latency of reprogramming programmable interrupt controllers when an interrupt does not occur.

Another of the objects of the present invention is to provide an efficient means for mutual exclusion which does not incur the performance penalties of interrupt protection for critical regions of code where it is unnecessary.

These and other objects of tile present invention are provided for by a method and apparatus which performs mutual exclusion tbr executing protected code in a computer system for handling interrupts. A current exclusion level of the computer system is stored as an old exclusion level. Then, tile method stores a desired exclusion level as the current exclusion level of the computer system for the execution of the protected code. The protected code is then executed and if an interrupt occurs during the execution of the protected code, then it is determined whether the interrupt has a priority level higher than the current exclusion level. If not, then the computer system is reconfigured to exclude interrupts having a lower priority than the current exclusion level and, the address of a first interrupt handling routine for the interrupt is stored as a deferred interrupt. Such reconfiguration may include the programming of a PIG. Alternatively, if the interrupt has a higher priority level than the current exclusion level, then the computer system is reconfigured to exclude interrupts having a lower priority level than the interrupt. The interrupt is serviced by calling a second interrupt handling routine and then the computer system is reconfigured to exclude interrupts having a lower priority level than the current exclusion level. The protected code then completes execution. Upon the completion of execution of the protected code, then it is determined whether a deferred interrupt has been stored, and if so, then the PIC is potentially programmed, and the interrupt handling routine is called to service the deferred interrupt at this time. It is then determined if the computer system has been reconfigured to operate at an exclusion level greater than the old exclusion level, and if so, then it is reconfigured to have an exclusion level equal to the old exclusion level. In summary, the system is only reconfigured if an interrupt actually occurs.

BRIEF DESCRIPTION OF THE DRAWINGS

The present invention is illustrated by way of example and not limitation in the figures of the accompanying in which like references indicate like elements and in which.

DETAILED DESCRIPTION

Figure 1A:
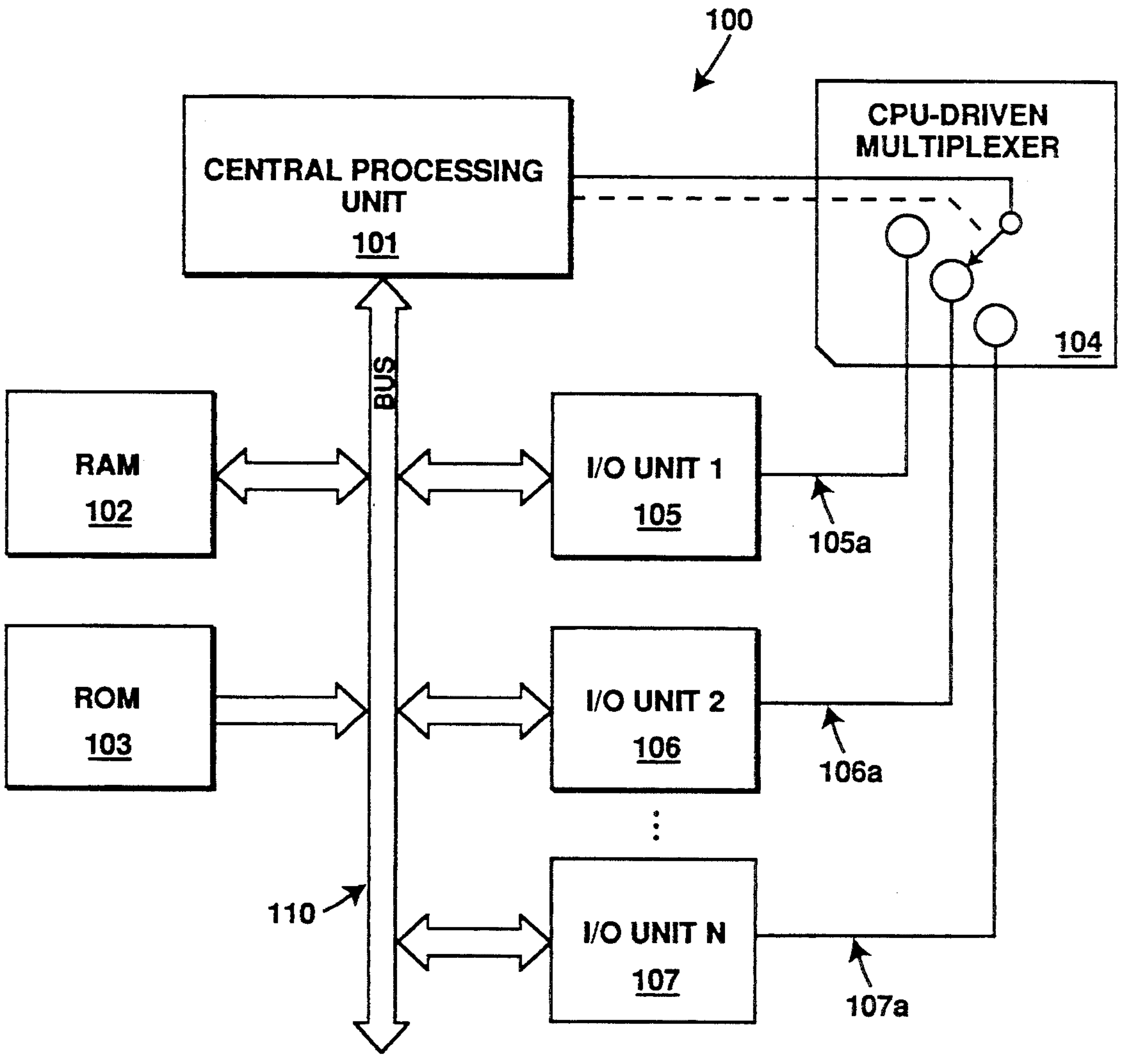
FIG. 1*a* shows a typical prior art "polled" method for servicing input/output devices.

A process and apparatus for mutual exclusion in a computer system is described. This process and apparatus may be used in a system which uses a programmable interrupt controller (PIC). In the following description, for the purposes of explanation, specific commands, processors, and operating systems are set forth in order to provide a thorough understanding of the present invention. It will be apparent, however, to one skilled in the art that the present invention may be practiced without these specific details. Specifically, while the thrust of the discussion which follows is directed towards the interrupt subsystem, it will be obvious to one skilled in thc art that the techniques and apparatus discussed here have equal applicability to mutual exclusion problems in computer systems in general, where it is computationally difficult or expensive to inform devices or processes that a lock is present. In other instances, well-known structures and techniques have been discussed, but not been shown in detail in order to not unnecessarily obscure the present invention.

The preferred embodiment of the present invention is implemented as a series of software routines which are used by a kernel and device drivers for mutual exclusion in an operating system employing the preferred embodiment. This may be implemented on a computer system which has an interrupt-driven architecture such as that shown generally as 150 in FIG. 1*b*. This code is compiled and linked from C-type source code into executable object code using a suitable C compiler and linker, and is used by the kernel of the operating system and the interrupt handlers implemented in the preferred embodiment. It is generally used when mutual exclusion of high and low priority executable code is sought. Of course, it can be appreciated bv one skilled in the art that other high or low level languages than C having equivalent capability may be used in alternative embodiments, and such processes or apparatus may be implemented in firmware, or discrete logic devices. In a preferred embodiment. these routines are designed to be run on the UNIX® brand Operating System V, Release 4, and subsequent releases as implemented on an AT-type architecture computer system such as one employing one or more 80×86 brand processors available from Intel Corporation of Santa Clara, Calif.

The preferred embodiment is implemented as a series of routines which are summarized as follows:

1. splN(): Sets the kemel state to the exclusion level specified by N. For the UNIX® brand operating system, each of the routines is therefore splO() through spl7(). In addition, to maintain compatibility with current versions of the UNIX® brand operating system, various aliases have been set forth in the preferred embodiment which map calls to specific device numbers for each priority level splN() procedure call to splO() through spl7(). For example, spltty() will directly map to one spIN() call wherein the appropriate value of N is inserted for the priority level of the terminal device. These routines only store the intended exclusion level so that interrupts generated by lower priority devices are not processed by the kernel until the exclusion level has been dropped below or equal to the level of the pending interrupt.

2. splx(): This routine restores the state of the kernel to exclusion level prior to that of the last spIN() call. This routine takes the value returned from the matching splN() call and restores the kernel to the previous operating exclusion level. If an interrupt was deferred due to an spIN() command, it will now be processed, and splx() invokes the interrupt handling routine for the particular device.

3. splint(): This routine sets the exclusion level for an interrupt. It is called when an interrupt occurs and it must be decided whether the device driver is to be called. If the device driver is called, it must use the appropriate splNO function to set the exclusion level. If not, splint() must defer an interrupt. This routine checks to sec if the interrupt priority is greater than the current exclusion level. If higher, the routine allows the interrupt handling routine to be called. If lower, it defers the interrupt and the interrupt handling routine is called later.

4. splxint(): This routine restores the exclusion level to the level it was before interrupt handling after the interrupt has been serviced. This routine also checks for additional deferred interrupts, like splx().

The foregoing four routines are used for mutual exclusion (e.g., for an interrupt handling process) which resets the operating system and reprograms the PIC's only after an interrupt occurs which has a different priority than the desired exclusion priority level of the system. In other words, the system is reset to a higher exclusion level and the PIC is reprogrammed only when an interrupt occurs during the execution of a protected region of code. In this way, the system is not reconfigured (and the PIC reprogrammed) in those instances where no interrupt occurred. In those cases where an interrupt does not occur during the execution of the code, the PIC has not been programmed to handle an interrupt which would not have occurred anyway. Therefore, the latency and the detrimental effects on overall system performance due to reconfiguring the system have been eliminated in most instances. This interrupt handling process is summarized and discussed with reference to processes 300*a* and 300*b* of FIGS. 3*a* and 3*b*.

Figure 3A:
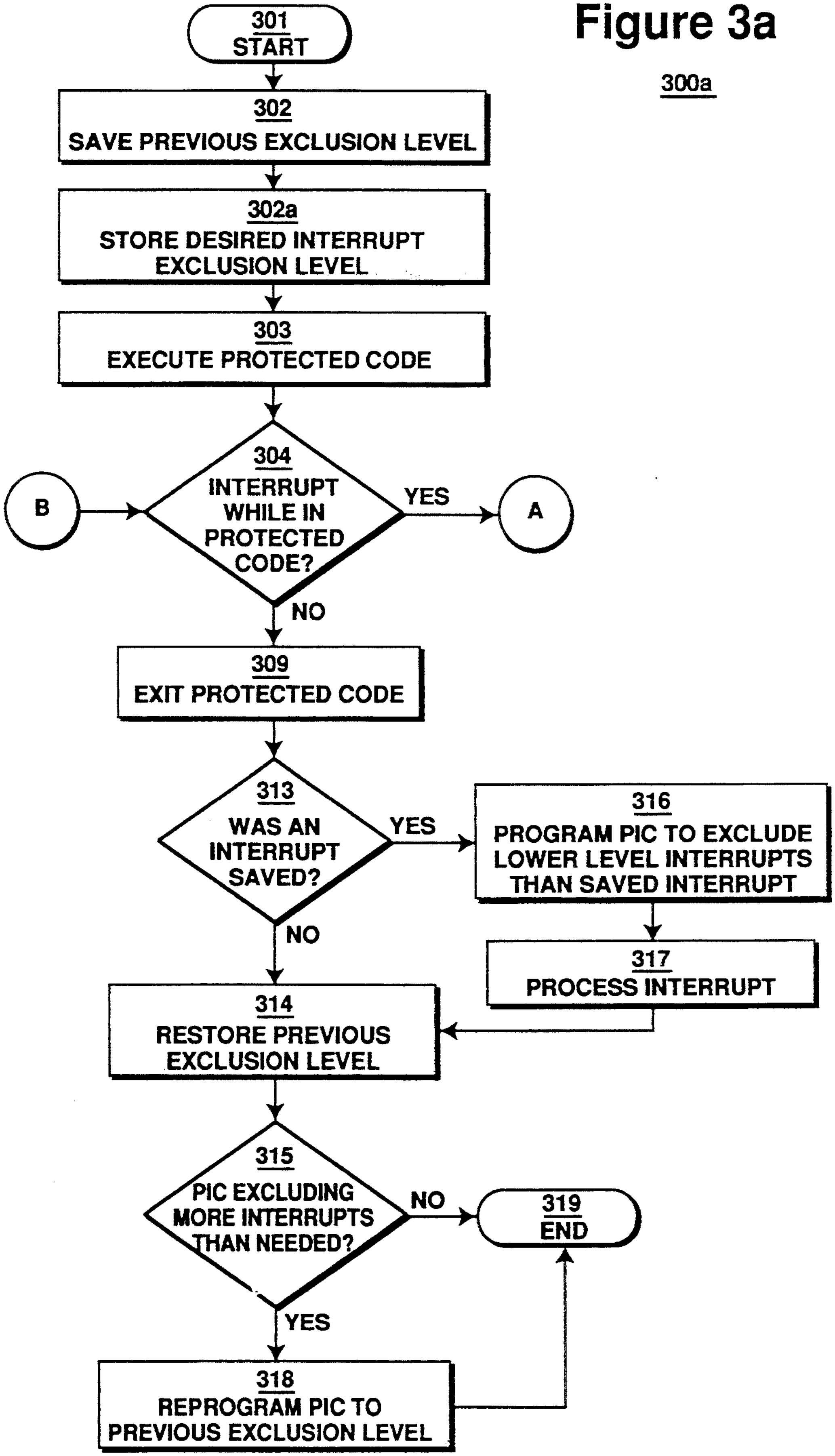
FIGS. 3*a* and 3*b* shows the process peribrined by the preferred embodiment which reprograms a programmable interrupt controller (PIC) only after incurring an interrupt.

Process 300*a* of FIG. 3*a* may be executed upon servicing an interrupt for a high priority device or process (such as a network request or user keyboard input), and a lower priority device (such as a printer) may interrupt the process. Process 300*a* of. FIG. 3*a* starts at step 301 such as by entry into a device driver routine or other similar process. Process 300 is implemented using combinations of calls to functions splN(), stix(), splint(), and splxint(). At step 302, the previous exclusion level of the kernel is saved. This is so that the exclusion level may be restored upon exit from process 300*a*. Then the current exclusion level desired for the kernel of the protected code is saved at step 302*a*. This sets the kernel state to the exclusion level specified by tile protected code. Then, the protected code is executed at step 303. If an interrupt occurs while executing the protected code, then a branch is taken to process 300*b* in FIG. 3*b*.

Figure 3B:
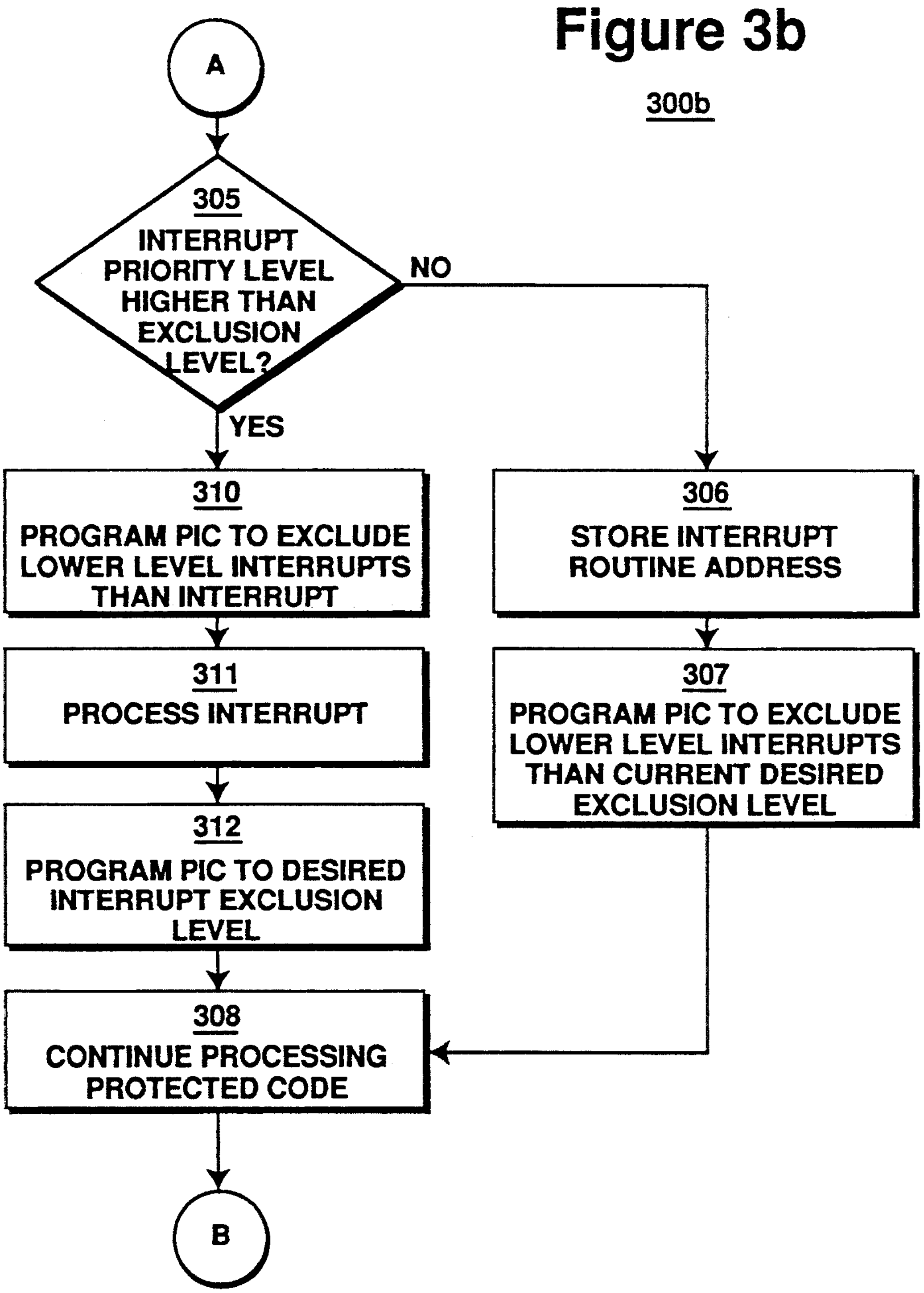

Process 300*b* of FIG. 3*b* will reprogram the programmable interrupt controller (PIC), however, it also must determine whether the interrupt should be processed immediately or whether it can be deferred. An interrupt occurring at a level higher than the stored exclusion level shall be serviced immediately, however, an interrupt at a lower priority level than the current desired exclusion level will be deferred. This is detected at step 305, wherein it is determined whether the priority level of the interrupt which occurred is higher than the current desired exclusion level. If the priority of the interrupt is lower than the desired exclusion level, then the adotress of the interrupt handling routine which would be invoked by the interrupt is stored at step 306, and then at step 307, the PIC is reprogrammed to exclude all lower level interrupts than the desired exclusion level. Then, step 307 proceeds to step 308 wherein the protected code continues executing and process 300*b* returns to step 304 to again determine whether any interrupts have occurred. Process 300*a* continues normally from this point.

In contrast, if the priority level of the interrupt which occurred was higher than the current desired exclusion level, as detected at step 305, then process 300*b* of FIG. 3*b* proceeds to step 310. At this point, bccause an interrupt has occurred which would have occurred anyway (its priority level is higher than the desired exclusion level), lower level interrupts than the pending interrupt must be prevented at step 310. Therefore, the PIC is programmed at step 310 to exclude any interrupt having a lower priority than the pending interrupt. Then, at step 311, the interrupt handling routine for the pending interrupt is called and the interrupt is serviced. When the interrupt handling routine routine returns at step 312, the PIG is again reprogrammed to the exclusion level desired for the kernel. Then, the remainder of the protected code continues executing at step 308, and process 300*b* returns to step 304 of process 300*a*, wherein additional interrupts may be detected.

Process 300*a* continues at step 304, and if no additional interrupts are detected, the protected code has completed execution at step 309. At this time, it is determined whether any interrupts were deferred from process 300*b* due to the desired exclusion level being higher than the interrupt which occurred. In other words, this is the point at which interrupts are serviced which would not have occurred if the PIC been programmed to the desired exclusion level prior to the entry into the protected code. It is determined at step 313 whether an interrupt was saved. If so, then process 300*a* proceeds to step 316 wherein the PIC is again reprogrammed to exclude any interrupts lower than the one which was saved and deferred, in order to prevent any other lower level interrupts from occurring. Then, the interrupt is serviced at step 317 by calling the normal interrupt handling routine for the interrupt which occurred by referencing the stored address of the interrupt handler routine. Then, at step 314, the previous exclusion level saved at step 302 is restored. Note that if no interrupts were saved. this step is also performed which branches from decision block 313.

At step 315, it is determined whether the PIC has currently been programmed to exclude interrupts at a higher priority level than that set at step 314. If so, then at step 318, the PIC is programmed to the original exclusion level set at step 314. Then, either through step 315 or step 318, process 300*a* is complete, and the kernel and the associated hardware has been restored to the proper exclusion level prior to entry into process 300*a*.

Figure 1B:
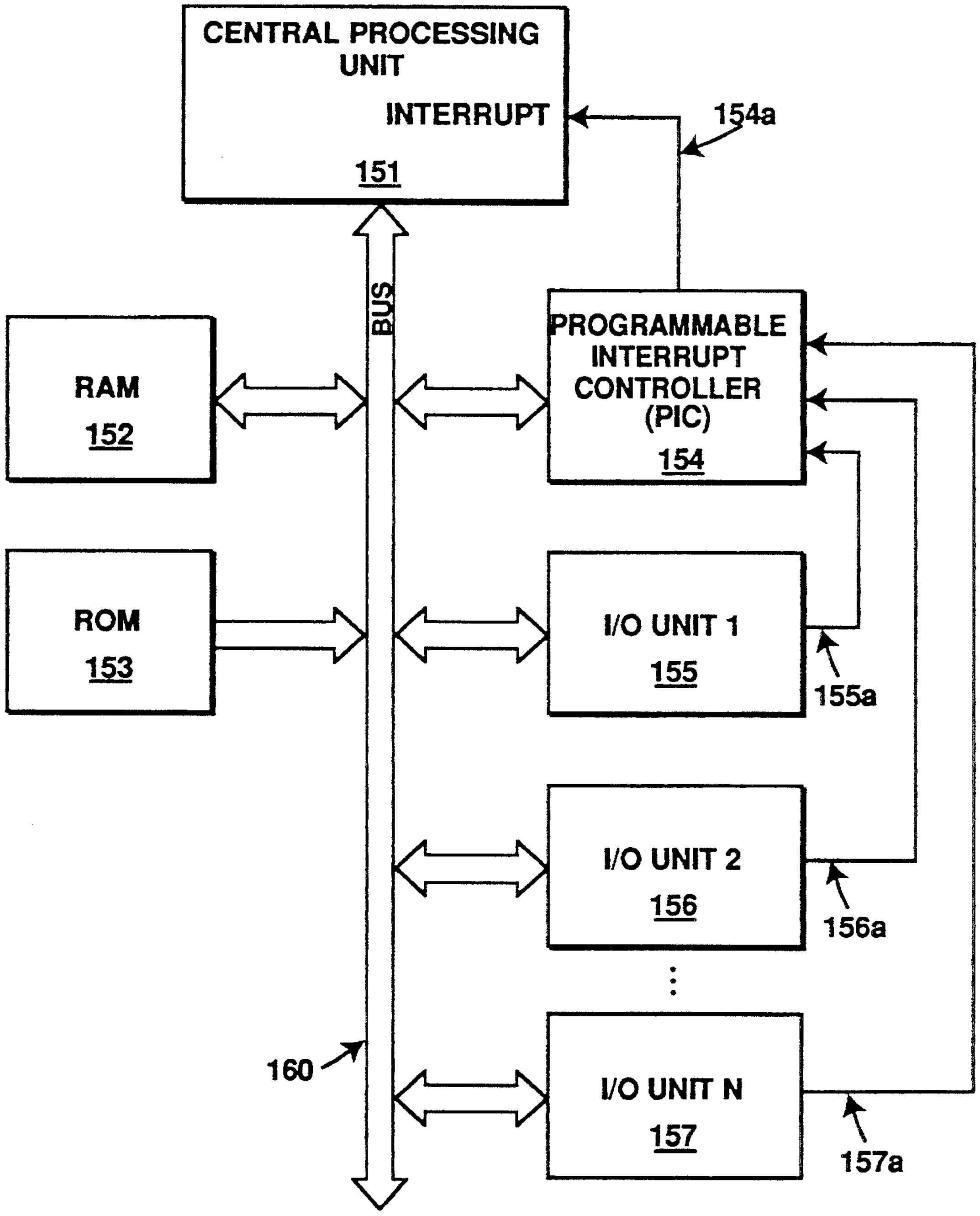
FIG. 1*b* shows a prior art interrupt method using a programmable interrupt controller (PIC) for servicing input/output devices.
Figure 2:
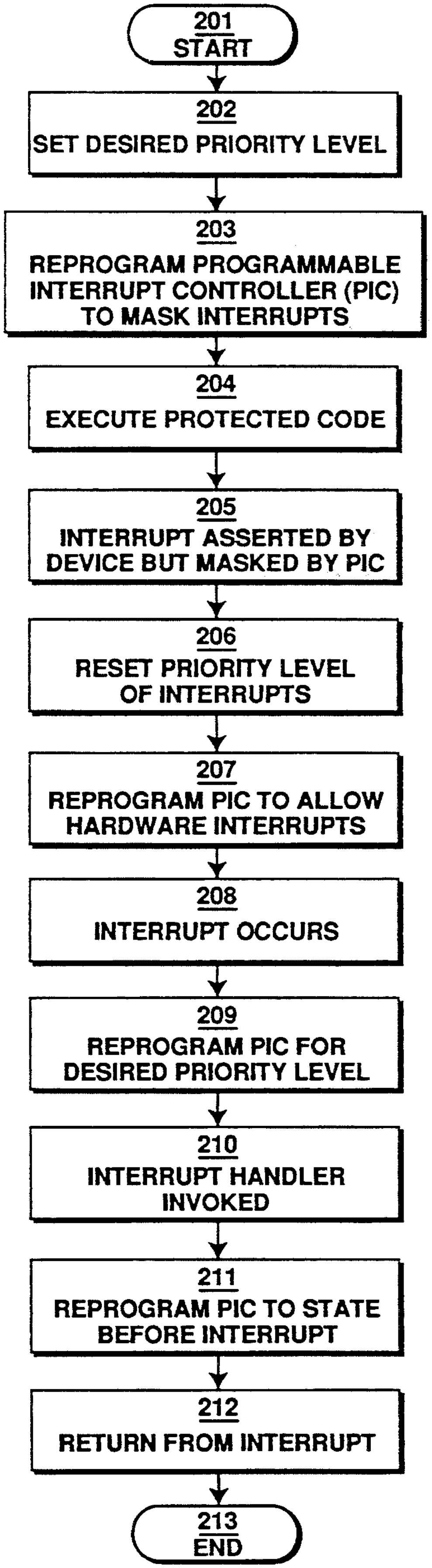
FIG. 2 shows a typical prior art interrupt handling process which reprograms the programmable interrupt controller for preventing interrupts by lower priority input/output devices.

Thus, in summary, the programmable interrupt controller for the system, such as 154 shown in FIG. 1*b*, is programmed if an interrupt occurs. Thus, programming of the PIC and the associated performance penalties, only occur upon the actual occurrence of an interrupt or, in other words, when the PIC should have been programmed. In those situations where no interrupt would have occurred. the PIC is not programmed, whereas in prior an systems it was programmed twice. It should also be noted that process 300 in FIG. 3, even in the worst case scenario of an interrupt having a higher priority than the desired exclusion level, the PIC is reprogrammed three times. This is in contrast to the prior art technique 200 discussed with reference to FIG. 2 wherein the PIC is reprogrammed four times. Due to the waits required by existing PIC's such as the 8259A, overall system performance has been substantially increased due to less latency from reconfiguring operations to the PIC and operating system kernel. Thus, substantial improvements in overall system performance are achieved.

In conclusion, processes 300*a* and 300*b* of FIGS. 3*a* and 3*b* are a distinct improvement over the prior an which always programs the PIC whenever a critical code region is entered. In the processes shown in 300*a* and 300*b*, the PIC is only reprogrammed, and the associated kernel interrupt level is only reset if absolutely necessary. The appropriate interrupt handling routines are called in order to ensure that all interrupts are serviced in their regular manner if an interrupt does occur. In addition, certain hardware platforms have eliminated the use of PIC's entirely, and entry into critical code regions are handled solely by the operating system software. In alternative embodiments, therefore, the associated hardware reprogramming which is discussed with reference to FIGS. 3*a* and 3*b* are replaced by operating system function calls which reset the appropriate exclusion level in the operating system kernel. In this case, no associated programming of the hardware devices in the computer system is required. This type of mutual exclusion for critical code regions in the operating system will still have the associated processing advantages by decreasing latency and thus increasing overall performance for interrupt handling and entering critical code regions, due to less reconfiguration of the operating system kernel. It can be appreciated by one skilled in the art that other departures and modifications within the spirit and scope of processes 300*a* and 300*b* disclosed in FIGS. 3*a* and 3*b* can be done one of ordinary skill in the art without departing from the overall spirit and scope of the present invention.

Thus, an invention for optimizing interrupt handling using mutual exclusion in a computer system has been described. Although the present invention has been described with reference to a specific embodiments in the text and with reference to FIGS. 3*a* and 3*b* above, it can be appreciated by one skilled in the an that the invention has utility far exceeding that disclosed in the figures. For example, instead of the porting of the UNIX® brand operating system to an AT-type computer system, it can be appreciated by one skilled in the art that other types of operating systems having other allocations of interrupt priorities may be utilized on a variety of hardware platforms. The process has equal application to situations wherein reconfiguration of system hardware and/or software for mutual exclusion should be mininfized.

What is claimed is:

1. In a computer system comprising a central processing unit (CPU), a programmable interrupt controller (PIC) coupled to said CPU, a plurality of devices coupled to said CPU and said PIC, each of said devices having a different priority levels of interrupt, and an operating system for controlling the operation of said computer system a method of mutual exclusion for executing protected code in said computer system, said method comprising the following steps:

a. storing a current exclusion level of said computer system as an old exclusion level;
b. setting a desired exclusion level for the execution of said protected code in the operating system of said computer system as the current exclusion level;
c. executing said protected code;
d. if an interrupt occurs during the execution of said protected code, then determining whether the interrupt has a priority level higher than said current exclusion level;
e. if said interrupt does not have a higher priority level than said current exclusion level, then performing the following steps:
   i. programming said PIC to exclude interrupts having a lower priority than said current exclusion level;
   ii. storing an address of a first interrupt handling routine for said interrupt as a deferred interrupt;
f. otherwise, if said interrupt has a higher priority level than said current exclusion level, then performing the following steps:
   i. programming said PIC to exclude interrupts having a lower priority level than said interrupt;
   ii. calling a second interrupt handling murine to service said interrupt;
   iii. programming said PIC to exclude interrupts having a lower priority level than said current exclusion level;
g. continuing to execute said protected code, and if an interrupt occurs during the execution of said protected code then determining whether the interrupt has a priority level higher than said current exclusion level and returning to step e;
h. upon the completion of execution of said protected code, then determining whether a deferred interrupt has been stored, and if so, then calling the first interrupt handling routine to service said deferred interrupt;
i. resetting the exclusion level in said operation system of said computer system to the old exclusion level;
j. determining whether the PIC is excluding more interrupts than the old exclusion level; and
k. if the PIC is excluding more interrupts than the old exclusion level then programming the PIC to exclude lower level interrupts than the old exclusion level.

2. The method of claim 1 wherein said programming of said PIC comprises issuing an interrupt mask value to an output port of said CPU to said PIC.

3. The method of claim 2 wherein the mask value contains values indicating interrupts which should be serviced.

4. The method of claim 1 wherein the programming of said PIC further comprises the step of attempting to read from a port until a value can be read from said port.

5. The method of claim 1 wherein the programming of said PIC further comprises waiting until the circuitry of said PIC has settled.

6. In a computer system, a method of mutual exclusion for executing protected code, said method comprising the following steps:

a. storing a current exclusion level of said computer system as an old exclusion level;
b. storing a desired exclusion level as the current exclusion level of said computer system for the execution of said protected code;
c. executing said protected code;
d. if an interrupt occurs during the execution of said protected code, then determining whether the interrupt has a priority level higher than said current exclusion level;
e. if said interrupt does not have a higher priority level than said current exclusion level, then performing the following steps:
   i. configuring said computer system to exclude interrupts having a lower priority than said current exclusion level;
   ii. storing an address of a first interrupt handling routine for said interrupt as a deferred interrupt;
f. otherwise, if said interrupt has a higher priority level than said current exclusion level, then performing the following steps:
   i. configuring said computer system to exclude interrupts having a lower priority level than said interrupt;

ii. calling a second interrupt handling routine to service said interrupt;

iii. reconfiguring said computer system to exclude interrupts having a lower priority level than said current exclusion level;

g. continuing to execute said protected code, and if an interrupt occurs during the execution of said protected code then determining whether the interrupt has a priority level higher than said current exclusion level and returning to step e;

h. upon the completion of execution of said protected code, then determining whether a deferred interrupt has been stored, and if so, then calling the first interrupt handling routine to service said deferred interrupt; and i. if the computer system has bccn rcconfigurcd to operate at the desired exclusion level as the current exclusion level then configuring the computer system to have an exclusion level cqual to the old exclusion level.

7. The method of claim 6 wherein the steps of configuring the computer system comprise programming a programmable in terrupt controller (PIC) in said computer system.

8. The method of claim 7 wherein said programming of said PIC comprises issuing an interupt mask value to an output port of a processor in said computer system to said PIC.

9. The method of claim 8 wherein the mask value contains values indicating interrupts which should be serviced.

10. The method of claim 7 wherein the programming of said PIC further comprises the step of attempting to read from an output port until a value can be read from said output port.

11. The method of claim 7 wherein the programming of said PIC further comprises waiting until the circuitry of said PIC has settled.

12. The method of claim 6 wherein the steps of configuring the computer system comprise informing a kernel of an operating system in said computer system to operate at an exclusion level.

13. In a computer system, a method of mutual exclusion for executing code, said method comprising the following steps:

a. storing a desired exclusion level as a current exclusion level of said computer system for the execution of said code;

b. executing said code;

c. upon the occurrence of an interrupt, if said interrupt does not have a higher priority level than said current exclusion level. then reconfiguring said computer system to exclude interrupts having a lower priority than said current exclusion level and storing said interrupt as a deferred interrupt;

d. if said interrupt has a higher priority level than said current exclusion level, then reconliguring said computer system to exclude interrupts having a lower priority level than said interrupt, calling a first interrupt handling routine to service said interrupt and, after completion of said first interrupt handling routine, reconfiguring said computer system to exclude interrupts having a lower priority level than said current exclusion level;

e. continuing to execute said code;

f. upon the completion of execution of said code, if a deferred interrupt has been stored, then calling a second interrupt handling rontine to service said deferred interrupt; and g. if the computer system has been rcconfigurcd to operate at the current exclusion level then reconfiguring the computer system to have an exclusion level equal to an old exclusion level.

14. In a computer system, a method of mutual exclusion for handling interrupts, said method comprising the following steps:

a. storing a desired exclusion level and a current exclusion level for the execution of code in said computer system;

b. executing said code;

c. upon the occurrence of an interrupt having a lower priority than said desired exclusion level, configuring said computer system to exclude interrupts having said lower priority than said desired exclusion level by programming a programmable interrupt controller (PIC) and storing said interrupt;

d. completing the execution of said code;

e. if the computer system has been configured to operate at the desired exclusion level then calling a first interrupt handling routine to service said stored interrupt and configuring the computer system to have an exclusion level equal to said current exclusion level.

15. The method of claim 14 wherein said programming of said PIC comprises issuing an interrupt mask value to an output port of a processor in said computer system to said PIC.

16. The method of claim 15 wherein the mask value contains values indicating interrupts which should be serviced.

17. The method of claim 16 wherein the programming of said PIC further comprises the step of attempting to read from an output port until a value can be read from said output port.

18. The method of claim 15 wherein the programing of said PIC further comprises waiting until circuitry of said PIC has settled.

19. In a computer system, a method of mutual exclusion for handling interrupts, said method.comprising the following steps:

a. storing a desired exclusion level and a current exclusion level for the execution of code in said computer system;

b. executing said code;

c. upon the occurrence of an interrupt having a lower priority than said desired exclusion level, configuring said computer system to exclude interrupts having said lower priority than said desired exclusion level by informing a kernel of an operating system in said computer system to operate at said desired exclusion level and storing said interrupt;

d. completing the execution of said code;

e. the computer system has been configured to operate at the desired exclusion level then calling a first interrupt handling routine to service said stored interrupt and configuring the computer system to have an exclusion level equal to said current exclusion level.

20. An apparatus for performing mutual exclusion for executing protected code and scowicing interrupts in a computer system comprising:

a. means for storing a current exclusion level of said computer system as an old exclusion level;

b. means for storing a desired exclusion level as the current exclusion level of said computer system for the execution of said protected code;

c. means for executing said protected code;

d. means for determining if an interrupt occurs during the execution of said protected code and means for determining whether the interrupt has a priority level higher than said current exclusion level;

c. means for determining if said interrupt does not have a higher priority level than said current exclusion level, and if said means determines that the interrupt does not have a higher priority level than said current exclusion level then a means for activating an apparatus including:

i. means for reconfiguring said computer system to exclude interrupts having a lower priority than said current exclusion level;

ii. means for storing an address of a first interrupt handling routine for said interrupt as a deferred interrupt;

f. a means for activating an apparatus as follows if said means for determining determines that said interrupt has a higher priority level than said current exclusion level said apparatus including:

i. means for reconfiguring said computer system to exclude interrupts having a lower priority level than said interrupt;

ii. means for calling a second interrupt handling routine to service said interrupt;

iii. means for reconfiguring said computer system to exclude interrupts having a lower priority level than said current exclusion level;

g. means for completing the execution of said protected code;

h. means for determining whether a deferred interrupt has been stored upon the completion of execution of said protected code, and a means for calling the first interrupt handling routine to service said deferred interrupt responsive to said determining means; and i. means for determining if the computer system has been reconfigured to operate at the desired exclusion level as the current exclusion level and a means for reconfiguring the computer system to have an exclusion level equal to the old exclusion level.

* * * * *

UNITED STATES PATENT AND TRADEMARK OFFICE
CERTIFICATE OF CORRECTION

PATENT NO. : 5,438,677

DATED : Aug. 1, 1995

INVENTOR(S) : Adams et al.

It is certified that error appears in the above-identified patent and that said Letters Patent is hereby corrected as shown below:

On the title page, in the seventh line of the Abstract in Section [57], delete "dessired" and substitute --desired--.

On the title page, in the ninth line of the Abstract in Section [57], delete "desked" and substitute --desired--.

In column 1, at line 11, delete "Backaround" and substitute --Background--.

In column 1, at line 33, delete "modem" and substitute --modern--.

In column 2, at line 3, delete "ternfinal" and substitute --terminal--.

In column 2, at line 7, delete "Modem" and substitute --Modern--.

In column 2, at line 51, delete "programn-fing" and substitute --programming--.

In column 3, at line 17, delete "Driver-Kemel" and substitute --Driver-Kernel--.

In column 3, at line 27, delete "interruler" and substitute --interrupt--.

In column 3, at line 63, delete "tollowed" and substitute --followed--.

In column 3, at line 64, delete "gad" and substitute --read--.

In column 4, at line 5, delete "Lit" and substitue --at--.

UNITED STATES PATENT AND TRADEMARK OFFICE
CERTIFICATE OF CORRECTION

PATENT NO. : 5,438,677

DATED : Aug. 1, 1995

INVENTOR(S) : Adams et al.

It is certified that error appears in the above-identified patent and that said Letters Patent is hereby corrected as shown below:

In the following locations, delete "tile" and substitue --the--:
column 4, line 28
column 4, line 35
column 4, line 65
column 5, line 2
column 7, line 36

In column 4, at line 38, delete "othcr" and substitute --other--.

In column 4, at line 67, delete "tbr" and substitute --for--.

In column 5, at line 14, delete "PIG" and substitute --PIC--.

In column 5, at line 48, delete "peribrined" and substitute --performed--.

In column 5, at line 66, delete "thc" and substitute --the--.

In column 6, at line 19, delete "bv" and substitute --by--.

In column 6, at line 32, delete "kemel" and substitute --kernel--.

In the following locations, delete "spIN()" and substitute --splN()--:
column 6, line 41
column 6, line 49
column 6, line 53

In column 6, at line 60, delete "splNO" and substitute --splN()--.

In column 6, at line 62, delete "sec" and substitute --see--.

UNITED STATES PATENT AND TRADEMARK OFFICE
CERTIFICATE OF CORRECTION

PATENT NO. : 5,438,677
DATED : Aug. 1, 1995
INVENTOR(S) : Adams et al.

It is certified that error appears in the above-identified patent and that said Letters Patent is hereby corrected as shown below:

In column 7, at line 30, delete "stix()" and substitute --splx()--.

In column 7, at line 52, delete "adotress" and substitue --address--.

In column 7, at line 64, delete "bccause" and substitute --because--.

In column 8, at line 6, delete "PIG" and substitute --PIC--.

In the following locations, delete "an" and substitute --art--:
column 8, line 49
column 8, line 63
column 9, line 29

In column 9, at line 3, delete "eliminatcd" and substitute --eliminated--.

In column 9, at line 39, delete "mininfized" and substitute --minimized--.

In column 10, at line 6, delete "murine" and substitute --routine--.

In column 11, at line 3, delete "reconfiguring" and substitute --configuring--.

In column 11, at line 16, delete "bccn rcconfigurcd" and substitute --been reconfigured--.

In column 11, at line 19, delete "cqual" and substitute --equal--.

In column 11, at line 58, delete "reconliguring" and substitute --reconfiguring--.

In column 12, at line 1, delete "rontine" and substitute --routine--.

UNITED STATES PATENT AND TRADEMARK OFFICE
CERTIFICATE OF CORRECTION

PATENT NO. : 5,438,677

DATED : Aug. 1, 1995

INVENTOR(S) : Adams et al.

It is certified that error appears in the above-identified patent and that said Letters Patent is hereby corrected as shown below:

In column 12, at line 3, delete "rcconfigurcd" and substitute --reconfigured--.

In column 12, at line 58, insert --if-- between "e." and "the".

In column 12, at line 65, delete "scowicing" and substitute --servicing--.

In column 13, at line 10, delete "c." and substitute --e.--

Signed and Sealed this

Seventh Day of January, 1997

*Attest:*

Bruce Lehman

BRUCE LEHMAN

*Attesting Officer* *Commissioner of Patents and Trademarks*